Patented Feb. 17, 1931

1,793,265

UNITED STATES PATENT OFFICE

DOUGLAS FRANK TWISS AND EDWARD ARTHUR MURPHY, OF BIRMINGHAM, ENGLAND, ASSIGNORS TO DUNLOP RUBBER COMPANY LIMITED, OF BIRMINGHAM, ENGLAND, A CORPORATION OF GREAT BRITAIN

PRODUCTION OF LATEX COMPOSITIONS

No Drawing. Application filed June 6, 1929, Serial No. 368,999, and in Great Britain July 26, 1928.

This invention is concerned with the production from aqueous dispersions of or containing rubber or similar materials of compositions of pasty or plastic solid consistency which have low water contents, for example 3 per cent or even lower than this, but are still substantially reversible in water and are particularly suitable for extruding and moulding and for the preparation of rubber sheet.

It is known to incorporate suitable proportions of protective colloids into rubber latex and to subject the latex to evaporation and soaps have been used for this purpose.

We have found that during evaporation of latex a stage of dehydration is reached when the protective colloids, artificially incorporated, as well as the natural colloids occurring in the latex, cease to function, with the result that further evaporation of water causes the latex to coagulate.

According to this invention we add to an aqueous dispersion of rubber such as rubber latex, which may be already in a concentrated and/or compounded condition, one or more substances which have as their principal function to serve, in place of water, as a meduim wherein the protective colloids both naturally occurring and artificially incorporated, will continue to function when the water in the dispersions is substantially removed (for example to about three per cent or lower) by further evaporation and we continue the evaporation until products of pasty or plastic solid consistency are obtained which are still substantially reversible in water.

Evaporation is conveniently carried out at or below 40° C. with gentle stirring, thus ensuring a continuous exposure of fresh surfaces during the evaporation process. If desired the rate of evaporation can be increased by a reduction of the atmospheric pressure.

It has been found that the addition for the particular purpose specified of the substances hereinafter mentioned serves also to prevent drying of the outer surfaces and aids the transference of water from the interior of the rubber dispersion to the atmosphere during the concentration. Examples of substances which will give the aforesaid desired result are polyhydroxy compounds such as polyhydric alcohols or their derivatives such as glycerol, glycol, diethylene glycol or alkyl ethers of these such as glycol monoethyl ether.

The colloids which have been found suitable for incorporation into the latex are soaps such as potassium oleate or ricinoleate; readily soluble soaps of other alkali metals are also applicable as also are the salts of fatty acids with organic bases such as piperidine oleate. Compounds of the first class, e. g. piperidine oleate have an additional advantage in that they are sufficiently stable to persist and remain effective during the evaporation process but may undergo decomposition during the final operation of vulcanization thereby aiding vulcanization and also effecting the disappearance of the soap-like protective colloid.

We have further found that pastes or plastic solids obtained in accordance with this invention can be rendered completely irreversible with regard to redispersion in water by subjecting them to the influence of mechanical treatment such as occurs in moulding, extruding, calendering or kneading. If desired the stability of the pastes or plastic solids can be further reduced by the incorporation of small quantities of de-stabilizing agents such as formaldehyde or calcium sulphate in order to hasten the desired coalescence on the application of the forces produced by extrusion, moulding or calendering. The products may also be rendered irreversible by the application of heat or by treatment with coagulating and/or dehydrating liquids.

An example of a composition which can be concentrated to about 3 per cent water content under the conditions herinbefore indicated to yield a reversible paste which becomes solid, for instance on being extruded, is as follows:—

Rubber (as latex) _____ 100.0
Oleic acid _____ 1.0
Caustic potash _____ 0.2
Glycerol _____ 5.0

If desired the protective ingredients may be removed from the articles formed from the pastes by, for example, extrusion or moulding, by washing in water. If the compounding ingredients include an ultra-accelerator and sulphur, this washing may conveniently be made to take place concurrently with vulcanization by heating the articles in boiling water.

Various modifications may be made by those skilled in the art without departing from the invention as defined in the appended claims.

What we claim is:

1. A process for the production of substantially reversible compositions of pasty consistency from aqueous dispersions containing rubber or similar materials and a protective colloid which consists in evaporating the aforesaid dispersions in the presence of one or more substances which have as their principal function to serve, in place of water, as a medium wherein the protective colloids both naturally occurring and artificially incorporated, will continue to function when the water in the dispersions is substantially removed.

2. The process as claimed in claim 1, wherein the substances added to the aforesaid dispersions to serve in the aforesaid manner are polyhydroxy compounds such as polyhydric alcohols or their derivatives such as glycerol, glycol, diethylene glycol or alkyl ethers of these such as glycol monoethyl ether.

3. The process as claimed in claim 1, wherein the aqueous dispersion of or containing rubber or similar materials is rubber latex.

4. The process as claimed in claim 1, wherein the aqueous dispersions are in a concentrated condition.

5. The process as claimed in claim 1, wherein to the aqueous dispersions are added protective colloids.

6. The process as claimed in claim 1, wherein the stability of the reversible compositions of pasty or plastic consistency is reduced by the incorporation into the aqueous dispersions aforesaid of small quantities of destabilizing agents such as formaldehyde or calcium sulphate.

7. The process as claimed in claim 1, wherein the protective ingredients added are subsequently removed by washing with water.

8. The process as claimed in claim 1, wherein the evaporation is proceeded with until the reversible products of pasty or plastic solid consistency obtained have a water content as low as 3% substantially as described.

9. The process as claimed in claim 1 wherein the aqueous dispersions are in compounded condition.

10. The process as claimed in claim 1 wherein soluble soaps are added as protective colloids to the aqueous dispersions.

11. A reversible aqueous dispersion containing rubber materials and a protective colloid of pasty constituency and containing a medium wherein the protective colloids continue to function, the water content of said dispersion being substantially removed.

12. The product of claim 11 in which the water content of the dispersion is about three per cent.

13. The product of claim 11 in which the medium in which said protective colloid functions is a polyhydric alcohol.

14. The composition of claim 11 in which a small quantity of a destabilizing agent is contained.

In witness whereof, we have hereunto signed our names.

DOUGLAS FRANK TWISS.
EDWARD ARTHUR MURPHY.